US012798961B2

(12) United States Patent
Otsuki et al.

(10) Patent No.: US 12,798,961 B2
(45) Date of Patent: Nov. 17, 2026

(54) HYDROGEN STORAGE MATERIAL, HYDROGEN STORAGE CONTAINER, AND HYDROGEN SUPPLY APPARATUS

(71) Applicant: SANTOKU CORPORATION, Kobe (JP)

(72) Inventors: Takayuki Otsuki, Kobe (JP); Hiroki Hayashi, Kobe (JP); Masakazu Nishimoto, Kobe (JP); Yasuhiko Kawaguchi, Kobe (JP); Naoki Sengoku, Kobe (JP)

(73) Assignee: SANTOKU CORPORATION, Kobe (JP)

( * ) Notice: Subject to any disclaimer, the term of this patent is extended or adjusted under 35 U.S.C. 154(b) by 197 days.

(21) Appl. No.: 18/835,782

(22) PCT Filed: Jan. 25, 2023

(86) PCT No.: PCT/JP2023/002225
§ 371 (c)(1),
(2) Date: Aug. 5, 2024

(87) PCT Pub. No.: WO2023/153207
PCT Pub. Date: Aug. 17, 2023

(65) Prior Publication Data

US 2025/0128938 A1 Apr. 24, 2025

(30) Foreign Application Priority Data

Feb. 8, 2022 (JP) ................................ 2022-018252

(51) Int. Cl.
*C01B 3/0078* (2026.01)
*C01B 3/0047* (2026.01)
(Continued)

(52) U.S. Cl.
CPC .......... *C01B 3/0078* (2013.01); *C01B 3/0047* (2013.01); *C01B 3/0057* (2013.01);
(Continued)

(58) Field of Classification Search
CPC ......... C22C 14/00; C22C 30/00; C22C 38/00; C22C 2202/04; C01B 3/0047; C01B 3/0078
See application file for complete search history.

(56) References Cited

U.S. PATENT DOCUMENTS 6,284,066 B1 * 9/2001 Shinya ................ C22C 32/0026 148/513
12,031,197 B2 * 7/2024 Otsuki .................... C22C 14/00
(Continued)

FOREIGN PATENT DOCUMENTS

CN 105779848 A 7/2016
CN 112961996 B * 5/2022
(Continued)

OTHER PUBLICATIONS

Yang et al "Effect of chromium, manganese and yttrium on microstructure and hydrogen storage properties of TiFe-based alloy", international journal of hydrogen energy 45 (2020) 12071-12081.*
(Continued)

*Primary Examiner* — Mark Kopec
(74) *Attorney, Agent, or Firm* — Sughrue Mion, PLLC

(57) ABSTRACT

Provided are a hydrogen storage material containing a TiFe-based alloy, a hydrogen storage container including the hydrogen storage material, and a hydrogen supply apparatus including the hydrogen storage container. The hydrogen storage material contains an alloy of an elemental composition represented by Formula (1), in which, in 1000× magnified COMP image of cross section of the alloy
(Continued)

obtained by EPMA, 25 or more and 3000 or less pieces of a phase in which R is enriched and that have phase sizes of 0.1 μm or more and 10 μm or less are present in a field of view of 85 μm×120 μm of the COMP image, and an R-enriched phase area ratio of total area $S_R$ $\mu m^2$ of pieces of the phase present in the field of view to area S $\mu m^2$ of field of view is 0.3% or more and 6.0% or less:

$$Ti_{(1-a-b)}R_aM1_bFe_cMn_dM2_eC_f. \qquad (1)$$

9 Claims, 5 Drawing Sheets

(51) Int. Cl.

| | |
|---|---|
| ***C22C 30/00*** | (2006.01) |
| ***C22C 30/04*** | (2006.01) |
| ***C22F 1/02*** | (2006.01) |
| ***C22F 1/16*** | (2006.01) |
| ***F17C 11/00*** | (2006.01) |

(52) U.S. Cl.

CPC .............. *C22C 30/00* (2013.01); *C22C 30/04* (2013.01); *C22F 1/02* (2013.01); *C22F 1/16* (2013.01); *F17C 11/005* (2013.01); *F17C 2221/012* (2013.01); *F17C 2265/06* (2013.01)

(56) References Cited

U.S. PATENT DOCUMENTS

| | | | | |
|---|---|---|---|---|
| 2006/0057019 | A1 * | 3/2006 | Young .................. | C01B 3/0078 420/455 |
| 2022/0282355 | A1 | 9/2022 | Otsuki et al. | |

FOREIGN PATENT DOCUMENTS

| | | | |
|---|---|---|---|
| JP | 61-250136 | A | 11/1986 |
| JP | 10-265875 | A | 10/1998 |
| JP | 10-265888 | A | 10/1998 |
| WO | 2021/033582 | A1 | 2/2021 |

OTHER PUBLICATIONS

Leng et al "Effects of Ce on the hydrogen storage properties of TiFe0.9Mn0.1 alloy", international journal of hydrogen energy 42 (2017) 23731-23736.*

Wang et al "Deoxidation Study On V—Ti—Fe as Hydrogen Storage Alloy", 6th International Symposium on High-Temperature Metallurgical Processing, 2015.*

Xiang "EPMA Image Fusion Scheme Based On Contourlet Transform", 2009 International Symposium on Intelligent Ubiquitous Computing and Education.*

International Search Report for PCT/JP2023/002225 dated Mar. 7, 2023.

Extended European Search Report dated Jan. 9, 2026 in European application No. 23752673.6.

* cited by examiner

HYDROGEN STORAGE MATERIAL, HYDROGEN STORAGE CONTAINER, AND HYDROGEN SUPPLY APPARATUS

CROSS REFERENCE TO RELATED APPLICATIONS

This application is a National Stage of International Application No. PCT/JP2023/002225 filed Jan. 25, 2023, claiming priority based on Japanese Patent Application No. 2022-018252 filed Feb. 8, 2022. The entire contents of which are hereby incorporated by reference.

TECHNICAL FIELD

The present invention relates to a hydrogen storage material, a hydrogen storage container, and a hydrogen supply apparatus.

BACKGROUND ART

A hydrogen storage alloy is an alloy capable of reversibly storing and releasing hydrogen, and has already been used as a negative electrode material of a nickel-metal hydride secondary battery; these days, the hydrogen storage alloy is also expected as a material capable of safely storing hydrogen, which is attracting attention as an energy source, and is being put into practical use for hydrogen storage/supply systems. There are various hydrogen storage alloys such as an AB5-based type, an AB2-based type, a TiFe-based type, and a BCC-based type such as TiVCr; among these, a TiFe-based alloy is a material that is made of the most inexpensive source materials and is most expected as hydrogen storage use in which a much larger amount than the amount used for a battery is needed.

However, the TiFe-based alloy is a difficult-to-use alloy type because the activation is not easy and the initial activation needs application of a temperature of 400° C. or higher and a pressure of 3 MPa or more. It is known that Mn addition is effective for the improvement; for example, technologies shown in the following patent literatures are known.

Patent Literature 1 discloses a titanium-based hydrogen storage alloy represented by the formula $Ti_{1+k}Fe_{1-1}Mn_{1}A_{m}$ (where 0≤k≤0.3, 0<1≤0.3, 0<m≤0.1, and A is an element composed of at least one of niobium and the rare earth elements). Patent Literature 1 further discloses that an alloy that is easy to activate and has a sufficient amount of hydrogen stored is obtained by adding Mn and an A element (at least one of Nb and the rare earth elements) to a TiFe alloy.

Patent Literature 2 discloses a hydrogen storage alloy made of an alloy having a composition represented by the general formula $(T_{1-a}Fe_{a})_{100-b-c-d}La_{b}M_{c}M'_{d}$ (where T is at least one element selected from Ti, Zr, and Hf, M is at least one element selected from V, Nb, Ta, Cr, Mo, and W, M' is at least one element selected from Mn, Co, Ni, Cu, Zn, B, Al, Ge, and Sn, a is 0.45≤a≤0.55 in terms of atomic ratio, and b, c, and d are 0.01≤b≤10, 0≤c≤20, and 0≤d≤30 in terms of atomic %, respectively), in which minute pieces of a crystalline phase having crystal grain sizes of 10 μm or less are precipitated in at least part of the alloy structure. Patent Literature 2 further discloses that a hydrogen storage alloy excellent in hydrogen storage characteristics and corrosion resistance is obtained by appropriately setting the kinds of the elements constituting the T component, Fe, the La component, the M component, and the M' component in the general formula and the composition ratio of each component and, after cooling and solidification, performing heat treatment to precipitate minute pieces of a crystalline phase.

Patent Literature 3 discloses a hydrogen storage alloy made of an alloy having a composition represented by the general formula $A_{a}T_{b}M_{c}M'_{d}$ (where A is at least one element selected from Ti, Zr, Hf, and V, T is at least one element selected from Ni, Co, Fe, Cu, Mn, and Cr, M is at least one element selected from Al, Si, Ga, Ge, Zn, Sn, In, and Sb, M' is at least one element selected from B, C, N, and P, and a, b, c, and d are 20≤a≤70, 30≤b≤60, 5≤c≤40, 0.1≤d≤10, and a+b+c+d=100 in terms of atomic %), in which minute pieces of a crystalline phase having crystal grain sizes of 10 μm or less are precipitated in at least part of the alloy structure. Patent Literature 3 further discloses that a hydrogen storage alloy excellent in hydrogen storage characteristics and corrosion resistance is obtained by appropriately setting the kinds of the elements constituting the A component, the T component, the M component, and the M' component in the general formula and the composition ratio of each component and, after cooling and solidification, performing heat treatment to precipitate minute pieces of a crystalline phase.

CITATION LIST

Patent Literature

Patent Literature 1: JP S61-250136 A
Patent Literature 2: JP H10-265875 A
Patent Literature 3: JP H10-265888 A

SUMMARY OF INVENTION

Technical Problem

However, although the initial activation of the TiFe-based alloy improves with increase in the amount of Mn added, the starting points and the ending points of absorption and release of hydrogen in a hydrogen pressure-composition isotherm diagram (hereinafter, occasionally referred to as a PCT curve) shift rightward with increase in the amount of Mn added, and consequently a problem that, although the amount of hydrogen stored is large, the amount of releasable hydrogen, which is the amount of hydrogen that can be available, is not sufficient has been seen. Further, the addition of Mn has an action of reducing the equilibrium pressure, and therefore there has been a concern that excessive addition of Mn will make it difficult to secure equilibrium pressure required as a hydrogen storage material. Thus, an issue of the present invention is to provide a hydrogen storage material containing a TiFe-based alloy that, while suppressing the amount of Mn, is favorably initially activated and has a sufficient amount of releasable hydrogen. Another issue of the present invention is to provide a hydrogen storage container including the hydrogen storage material and a hydrogen supply apparatus including the hydrogen storage container.

Solution to Problem

As a result of extensive studies to solve the above issues, the present inventors have found an alloy having a specific elemental composition containing Ti, a rare earth element, and Fe, and have completed the present invention.

That is, according to the present invention, there is provided a hydrogen storage material comprising an alloy of an elemental composition represented by Formula (1) below, wherein, in a 1000 times magnified COMP image of a cross section of the alloy obtained by EPMA, 25 or more and 3000 or less pieces of a phase in which R is enriched and that have phase sizes of 0.1 μm or more and 10 μm or less are present in a field of view of 85 μm×120 μm of the COMP image, and an R-enriched phase area ratio $[(S_R/S)\times 100(\%)]$ of the total area $S_R$ $\mu m^2$ of the pieces of the phase present in the field of view to the area S (10200) $\mu m^2$ of the field of view is 0.3% or more and 6.0% or less,

[Chem. 1]

$$Ti_{(1-a-b)}R_aM1_bFe_cMn_dM2_eC_f \quad (1)$$

wherein R is at least one selected from the rare earth elements, and indispensably contains Ce; M1 represents at least one selected from the group consisting of V, Zr, Nb, Ta, and Mo, and M2 represents at least one selected from the transition metal elements (excluding the rare earth elements, M1, Ti, Fe, and Mn), Al, B, Ga, Si, and Sn; here, the rare earth elements include Sc and Y; and a is 0.003≤a≤0.15, b is 0≤b≤0.20, c is 0.40≤c≤1.15, d is 0≤d≤0.15, e is 0≤e≤0.20, f is 0≤f≤0.07, and c+d+e is 0.60≤c+d+e≤1.15.

According to another aspect of the present invention, there are provided a hydrogen storage container including the hydrogen storage material and a hydrogen supply apparatus including the hydrogen storage container.

Advantageous Effects of Invention

Since the hydrogen storage material of the present invention contains an alloy of the above specific elemental composition, the hydrogen storage material is favorably initially activated and has a sufficient amount of releasable hydrogen, and can be suitably used for hydrogen storage.

DESCRIPTION OF EMBODIMENTS

Figure 1:
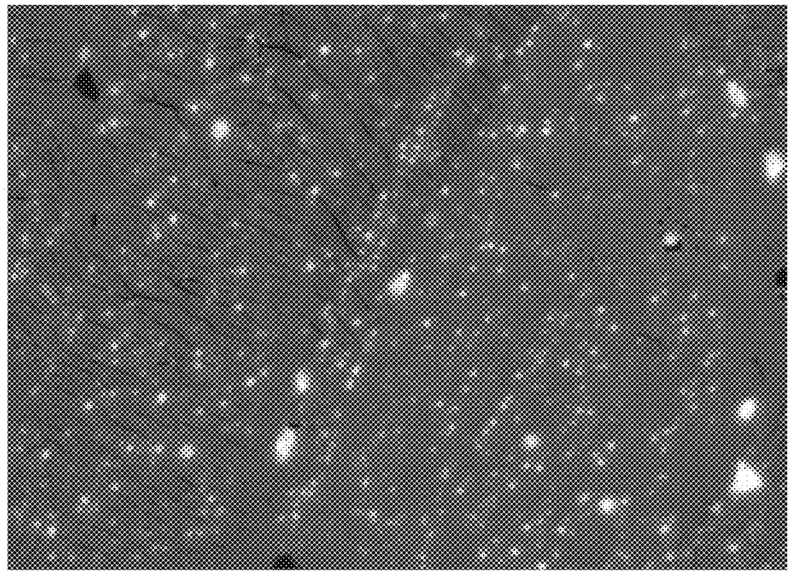
FIG. 1 is a view showing a COMP image photograph of a cross section of a post-heat-treatment alloy cast piece of Example 1.

Hereinbelow, the present invention is described in detail. A hydrogen storage material of the present invention is a material containing an alloy of an elemental composition represented by Formula (1) below. The hydrogen storage material is preferably a material made of the alloy.

[Chem. 2]

$$Ti_{(1-a-b)}R_aM1_bFe_cMn_dM2_eC_f \quad (1)$$

wherein R is at least one selected from the rare earth elements, and indispensably contains Ce; M1 represents at least one selected from the group consisting of V, Zr, Nb, Ta, and Mo, and M2 represents at least one selected from the transition metal elements (excluding the rare earth elements, M1, Ti, Fe, and Mn), Al, B, Ga, Si, and Sn; here, the rare earth elements include Sc and Y; and a is 0.003≤a≤0.15, b is 0≤b≤0.20, c is 0.40≤c≤1.15, d is 0≤d≤0.15, e is 0≤e≤0.20, f is 0≤f≤0.07, and c+d+e is 0.60≤c+d+e≤1.15.

In Formula (1), a, b, c, d, e, and f are the content ratios of the respective elements expressed in molar ratio, and details are as follows. Hereinafter, the content ratio may be referred to as a "content amount" or an "amount".

R in Formula (1) is at least one selected from the rare earth elements, and indispensably contains Ce. Here, the rare earth elements include Sc (scandium) and Y (yttrium). Accordingly, examples of R include Sc, Y, La, Ce, Pr, Nd, Pm, Sm, Eu, Gd, Tb, Dy, Ho, Er, Tm, Yb, and Lu. Among these, preferred rare earth elements other than Ce are La, Pr, Nd, and Sm, and these elements may be contained in addition to Ce. The content amount of Ce in R is preferably 30 mass % or more and more preferably 50 mass % or more with respect to the total amount of R. R is effective in improving the initial activation, increasing the amount of hydrogen stored, increasing the equilibrium pressures at the times of absorption and desorption of hydrogen, and eliminating two-stage plateaus in the PCT curve. "a" representing the content amount of R in Formula (1) is 0.003≤a≤0.15, preferably 0.003≤a≤0.10, and more preferably 0.005≤a≤0.08.

M1 in Formula (1) is at least one selected from the group consisting of V, Zr, Nb, Ta, and Mo. M1 is not necessarily needed, but is an element mainly contributing to adjustment of various characteristics. For example, an effect of improvement of the initial activation is provided by formation of intermetallic compounds between the main constituent elements Ti, Mn, Fe, etc. and the M1 element, and the M1 element may be contained when fine adjustment of characteristics is needed depending on the use conditions at the time of hydrogen storage. "b" representing the content amount of M1 in Formula (1) is 0≤b≤0.20, preferably 0≤b≤0.05.

"c" in Formula (1) represents the content amount of Fe. "c" is 0.40≤c≤1.15, preferably 0.50≤c≤0.95, and more preferably 0.65≤c≤0.95. If the amount of Fe in the TiFe-based alloy is large and c is more than 1.15, initial activation is difficult, and a sufficient amount of hydrogen stored may be impossible to obtain in use as a hydrogen storage material. If the amount of Fe in the TiFe-based alloy is small and c is less than 0.40, the amount of hydrogen stored is reduced and the equilibrium pressures of absorption and desorption of hydrogen are too low, and effective working may not be made in use as a hydrogen storage material.

"d" in Formula (1) represents the content amount of Mn. "d" is 0≤d≤0.15, preferably 0≤d≤0.12, more preferably 0≤d≤0.05, and particularly preferably 0≤d≤0.045. If the amount of Mn in the TiFe-based alloy is large and d is more than 0.15, the starting points of absorption and release of hydrogen of the PCT curve are shifted rightward, and hydrogen may be impossible to effectively use in use as a hydrogen storage material. When the amount of Mn in the TiFe-based alloy is small, it has been the case that the initial activation is difficult, consequently a sufficient amount of hydrogen stored may be impossible to obtain in use as a hydrogen storage material or huge amounts of labor and time may be required for the initial activation, and practicality is lacking; however, in the present application, even when d is 0, initial activation and an amount of hydrogen stored that can withstand practical use can be obtained.

M2 in Formula (1) represents at least one selected from the transition metal elements (excluding the rare earth elements, M1, Ti, Fe, and Mn), Al, B, Ga, Si, and Sn. M2 is preferably at least one selected from Co, Ni, Cu, Cr, Al, B, Ga, Si, and Sn. M2 is not necessarily needed, but is an element mainly contributing to adjustment of various characteristics. For example, M2 may be contained when fine adjustment of characteristics is needed depending on the use conditions at the time of hydrogen storage. "e" representing the content amount of M2 in Formula (1) is $0 \leq e \leq 0.20$, preferably $0 \leq e \leq 0.10$.

"f" in Formula (1) represents the content amount of C (carbon). "f" is $0 \leq f \leq 0.07$, preferably $0.001 \leq f \leq 0.05$, and more preferably $0.001 \leq f \leq 0.035$. C is effective in increasing the equilibrium pressures at the times of absorption and desorption of hydrogen and eliminating two-stage plateaus in the PCT curve.

Both R and C in Formula (1) are, as described above, elements effective in increasing the equilibrium pressures at the times of absorption and desorption of hydrogen and eliminating two-stage plateaus in the PCT curve, and higher effects are obtained by combining both. In Formula (1), it is preferable that f be $0.001 \leq f$, and a+f be $0.005 \leq a+f \leq 0.11$.

In Formula (1), c+d+e represents the total content amount of Fe, Mn, and M2. This value affects the activation and the equilibrium pressure of the hydrogen storage material of the present invention, and an alloy that is easy to initially activate while keeping equilibrium pressure necessary for hydrogen storage can be obtained by adjusting this value to the following range. c+d+e is $0.60 \leq c+d+e \leq 1.15$, preferably $0.70 \leq c+d+e \leq 1.10$, and more preferably $0.75 \leq c+d+e \leq 1.00$.

The elemental composition of the alloy of the present invention represented by Formula (1) above can be examined by performing quantitative analysis with an ICP (inductively coupled plasma) analysis apparatus. In the present specification, the alloy of the present invention refers to, unless otherwise specified, an alloy of an elemental composition represented by Formula (1).

The alloy of the present invention has the following structural feature. Specifically, in a 1000 times magnified COMP image of a cross section of the alloy obtained with an EPMA (electron probe micro analyzer), a phase in which R is enriched (an R-enriched phase) is in a specific size range, and has the following feature. That is, the R-enriched phase has a feature in which 25 or more and 3000 or less pieces of the R-enriched phase having phase sizes of 0.1 μm or more and 10 μm or less are present in a field of view of 85 μm×120 μm of the COMP image and, when the area of the field of view is denoted by S $\mu m^2$ and the total area of the pieces of the R-enriched phase present in the field of view is denoted by $S_R$ $\mu m^2$, $(S_R/S) \times 100(\%)$ is 0.3% or more and 6.0% or less. S is 10200 (85×120). In the present specification, $(S_R/S) \times 100(\%)$ is referred to as an "R-enriched phase area ratio".

Here, the cross section of the alloy refers to a cross section formed by a process in which the alloy is embedded in a room temperature-curable resin (for example, an epoxy resin) and curing is performed, the test piece is subjected to rough polishing and precision polishing with a wet polishing machine, and finally the polished surface is finished to a mirror surface. The size of the alloy when forming a cross section is not particularly limited; for example, an alloy thin piece of about 1 cm square or an alloy cast piece of about 1 $cm^3$ may be used.

In the observation of the cross section thus formed, the alloy of the present invention forms a sea-island structure in which a plurality of pieces of the R-enriched phase are present in the main phase of the TiFe-based alloy. By virtue of the fact that pieces of the R-enriched phase, which are islands, are dispersed in the main phase of the TiFe-based alloy, which is the sea, in the above manner, although a detailed mechanism is not clear, both favorable initial activation and securing of a favorable amount of releasable hydrogen as a hydrogen storage material can be achieved. As a result, absorption and desorption of hydrogen, which are repeatedly performed, can be performed efficiently and favorably. Each element in the main phase and the R-enriched phase can be observed with a mapping image of contained elements obtained by surface analysis based on EPMA.

In the present application, the degree of initial activation is used as an index indicating whether the initial activation is favorable or not. In the present application, the degree of initial activation indicates the ease of absorption of hydrogen, that is, the time (minutes) required to absorb a certain amount of hydrogen when the hydrogen storage material first absorbs (stores) hydrogen. Therefore, it is determined that the smaller the numerical value of the degree of initial activation is, the more favorable the initial activation is. Specifically, the degree of initial activation is measured by an "activation rate test" described below. In the case where the TiFe-based alloy used for a hydrogen storage material contains a large amount of Mn, the value of the degree of initial activation is small, and the initial activation is favorable. However, on the other hand, when the amount of Mn is large, there is a problem that the amount of releasable hydrogen is reduced, that is, the stored hydrogen cannot be sufficiently released.

The activation rate test is performed as follows. About 5 g of a hydrogen storage material having particle sizes of 500 μm or less is loaded into a sample chamber equipped with an accumulator, a piping section, and a sample loading section and having a total volume of about 138 ml, evacuation is performed at 80° C. for 2 hours as prior processing (the degree of vacuum: about 0.5 to 2.5 Pa), and then absorption of hydrogen into the hydrogen storage material is started at 25° C. and an initial hydrogen pressure of about 0.85 MPa (the total amount of hydrogen: about 0.05 mol). Next, the time it takes for the hydrogen pressure to decrease by 60 kPa from the initial hydrogen pressure is measured. The measured time is referred to as the "degree of initial activation". The degree of initial activation is preferably 14.5 hours or less, and more preferably 10 hours or less. Although the initial activation time is preferably as short as possible, the lower limit value is practically 0.1 hours or more.

In the present application, the amount of releasable hydrogen is in contrast to the amount of hydrogen stored in the hydrogen storage material, and it means the amount of hydrogen that can be released, that is, the amount of hydrogen that can be effectively used. Specifically, the difference between the hydrogen content at the time of 1 MPa of a PCT absorption curve at 0° C. and the hydrogen content at the time of 0.1 MPa of a PCT desorption curve at 50° C. is defined as the amount of releasable hydrogen. The hydrogen content is defined as a value of the amount of hydrogen in the hydrogen storage material expressed in weight percentage (wt %). The amount of releasable hydrogen is preferably 1.20 wt % or more, more preferably 1.40 wt % or more, and particularly preferably 1.61 wt % or more. The upper limit value of the amount of releasable hydrogen is practically 2.5 wt % or less.

For the alloy of the present invention, it is preferable that, in a PCT desorption curve at 50° C., the hydrogen desorption pressure $P_{a1}$ at 0.3 wt (weight) % hydrogen content and the hydrogen desorption pressure $P_{a2}$ at 0.1 wt % hydrogen content satisfy the relational expression of $[\{\log_{10}(P_{a1})-\log_{10}(P_{a2})\}/0.2]\leq 1.10$. This is because, by holding of the above feature by the PCT curve, the squareness of the curve becomes clearer and a larger amount of hydrogen can be released when ending the release of hydrogen at a predetermined pressure, and therefore a very suitable hydrogen storage material in which the stored hydrogen can be effectively utilized without being left in the alloy can be obtained. The squareness refers to what degree of shoulder shape the last-stage shape of the PCT desorption curve exhibits; the clearer the shoulder shape is, the better the squareness is evaluated as. In the present application, the value of $[\{\log_{10}(P_{a1})-\log_{10}(P_{a2})\}/0.2]$ is used as an index indicating whether the squareness is good or not, and the value is referred to as squareness for the sake of convenience.

The main phase of the TiFe-based alloy is a phase mainly having a TiFe phase (which may contain a substitution element such as Mn). Hereinafter, the main phase of the TiFe-based alloy may be simply referred to as a main phase. The phase size of the main phase is preferably 200 μm or less, and more preferably 150 μm or less. The phase size of the main phase is preferably 2 μm or more. The phase in which R is enriched (an R-enriched phase) is a phase formed mostly of the R element, and may contain C (carbon) (may contain small amounts of other additive elements). The R-enriched phase is, in observation in the above-mentioned field of view of a cross section, dispersed in the main phase as minute islands having shapes like those shown in FIG. 1, and the phase size is in the size range of 0.1 μm or more and 10 μm or less. Here, the phase size is a value obtained by measuring the major axis and the minor axis of each piece of the phase and using the formula of "(major axis+minor axis)/2".

In the case where the alloy of the present invention contains C (carbon), C is relatively abundant in the R-enriched phase. Although a detailed mechanism is not clear, it is presumed that, by the containing of C by the R-enriched phase dispersed in the above manner, more effects are obtained in increasing the equilibrium pressures at the times of absorption and desorption of hydrogen and eliminating two-stage plateaus in the PCT curve.

Next, a method for producing the hydrogen storage material of the present invention is described. First, examples of the method for preparing an alloy include a strip casting method such as a single-roll method, a twin-roll method, or a disk method, and a mold casting method.

For example, in the strip casting method, source materials blended to obtain a desired alloy composition are prepared. Next, in an inert gas atmosphere such as Ar, the blended source materials are heated and melted into an alloy melt, and then the alloy melt is poured onto a copper-made, water-cooled roll and is rapidly cooled and solidified to obtain an alloy cast piece. As the copper-made, water-cooled roll, also a roll having a coating layer containing Ni, Cr, other elements, etc. on its surface can be used. The coating layer may be formed of, for example, a metal, an alloy, a ceramic, or the like.

In the mold casting method, an alloy melt is obtained in a similar manner, and then the alloy melt is poured into a water-cooled copper mold and is cooled and solidified to obtain an ingot. The strip casting method and the mold casting method are different in cooling rate; in general, the strip casting method is preferable when it is attempted to obtain an alloy having less segregation and a uniform composition distribution. Although the alloy of the present invention is an alloy in which minute pieces of the R-enriched phase are dispersed separately from the main phase of the TiFe-based alloy, it is preferable that the composition distribution be uniform in the main phase portion of the TiFe-based alloy other than the R-enriched phase; thus, the strip casting method is a preferred method also in the present invention. Further, since the TiFe-based alloy is very hard and is not easy to pulverize, the strip casting method is preferable also in this respect.

The cooling rate of the alloy melt when producing an alloy cast piece is controlled as follows in order to control the number of pieces of the R-enriched phase having phase sizes of 0.1 μm or more and 10 μm or less and the R-enriched phase area ratio $[(S_R/S)\times 100]$ to the ranges of the present invention mentioned above. That is, the cooling rate in the period in which the alloy temperature changes from the cooling start temperature of the alloy melt (for example, the temperature at the point of time when the molten metal comes into contact with the roll) to 950° C. is set to 300° C./sec or more. The cooling rate is set to preferably 700° C./sec or more, more preferably 1000° C./sec or more, and particularly preferably 1500° C./sec or more. The upper limit of the cooling rate is not particularly specified, but is practically about 50000° C./sec or less. The cooling start temperature of the alloy melt varies depending on the alloy composition, but is in the range of about 1300 to 1500° C. The cooling rate at less than 950° C. is not particularly limited; for example, in the case of the strip casting method, after peeled off from the roll, the strip may be left until 100° C. or lower, for example, and may be recovered.

The alloy cast piece obtained by cooling is preferably subjected to heat treatment in order to obtain an alloy in which the composition distribution of the main phase portion of the TiFe-based alloy is more uniform. The heat treatment can be performed in the range of 700° C. or higher and 1250° C. or lower in an inert gas atmosphere such as Ar. The heat treatment temperature is preferably 900° C. or higher and 1150° C. or lower, and the heat treatment time is 0.35 hours or more and less than 48 hours, preferably 2 hours or more and less than 24 hours. This heat treatment can be performed in a known heat treatment furnace capable of controlling the atmosphere. For example, a rotary furnace such as a chamber type batch furnace, a continuous furnace, or a rotary kiln furnace may be used.

Next, the alloy cast piece obtained by casting is pulverized to obtain an alloy powder. The pulverization can be performed using a known pulverizing machine. The particle size of the alloy powder is preferably 800 μm or less, and more preferably 500 μm or less. The lower limit of the particle size of the alloy powder does not particularly need to be specified, but is practically about 0.1 μm. Here, the particle size of the alloy powder refers to a diameter measured with a sieve shaker (the RO-TAP type). The O value of the alloy powder is preferably 3500 ppm or less, and the N value is preferably 1500 ppm or less. The "O value" is the total amount of oxygen of oxygen and oxygen compounds contained in the alloy powder expressed as the amount of oxygen atoms. The "N value" is the total amount of nitrogen of nitrogen and nitrogen compounds contained in the alloy powder expressed as the amount of nitrogen atoms.

The hydrogen storage material of the present invention may be an alloy itself thus prepared in a powder form, alternatively may be a composite obtained by mixing an alloy powder, a resin, etc. and molding the mixture into an arbitrary shape such as a granular shape, or may be a composite in which an alloy powder is immobilized on a temperature-controllable material. In this case, the resin functions as a binder of the alloy powder. The mixing can be performed by a known method. For example, the mixing can be performed with a mortar, or can be performed using a rotary mixer such as a double cone type or a V type, a stirring mixer such as a blade type or a screw type, or the like. It is also possible to mix an alloy cast piece and a binder while pulverizing them by using a pulverizing machine such as a ball mill or an attritor mill.

A hydrogen storage container of the present invention includes the hydrogen storage material produced in the above manner, and known ones may be used as the material and the shape of the container.

A hydrogen supply apparatus of the present invention includes the hydrogen storage container; otherwise, known configurations may be used.

EXAMPLES

The present invention will now be described in detail using Examples and Comparative Examples, but the present invention is not limited thereto. In the description of the present Examples, all of the alloys of the present invention of the Examples and the alloys of the Comparative Examples outside the scope of the present invention are referred to as “alloys”. Further, an alloy obtained in the form of a cast piece by the strip casting method is referred to as an alloy cast piece, and a product obtained by pulverizing the alloy cast piece is referred to as an alloy powder.

Example 1

Source material metals were weighed out such that the elemental composition of the alloy finally obtained would be the composition shown in Table 1, and were melted in an argon gas (Ar) atmosphere in a high-frequency melting furnace to obtain an alloy melt. Subsequently, with the pouring temperature of the melt set to 1450° C., the melt was rapidly cooled and solidified by the strip casting method with a single-roll casting apparatus using a copper-made, water-cooled roll, and an alloy cast piece having a thickness variation of about 0.1 to 0.4 mm and an average thickness of 0.25 mm was obtained. The cooling start temperature of the alloy melt, that is, the temperature at the point of time when the alloy melt came into contact with the copper-made, water-cooled roll was about 1400° C. There was a difference in cooling rate between the roll contact side and the non-contact side of the alloy melt, and the cooling rate in the period from 1400° C. to 950° C. was between 2000° C./sec and 3000° C./sec.

The alloy cast piece obtained as above was subjected to heat treatment by being held at 1050° C. for 6 hours in an Ar atmosphere in a heat treatment furnace. After the heat treatment, the alloy cast piece was embedded in an epoxy resin and curing was performed, rough polishing and precision polishing were performed with a wet polishing machine, and finally the polished surface was finished to a mirror surface to form an alloy cross section; the cross section was subjected to surface analysis (a COMP image, a mapping image of elements) under the conditions of a magnification of 1000 times, an acceleration voltage of 15 kV, a current of $1\times10^{-7}$ A, and a beam diameter of 1 μm by using an FE (field emission) type EPMA (trade name: JXA-8530F, manufactured by JEOL Ltd.). The number of pieces of the R-enriched phase having phase sizes of 0.1 to 10 μm in a field of view of 85 μm×120 μm of the COMP image was visually counted. The number of the count is referred to as the “number of pieces of the R-enriched phase”. Further, the R-enriched phase area ratio $[(S_R/S)\times 100(\%)]$ of the total area $S_R$ of the pieces of the phase in the field of view to the area S of the field of view was calculated. The results are shown in Table 1. FIG. 1 shows a copy of a COMP image of an alloy cross section.

Further, the alloy cast piece after heat treatment was pulverized with a stainless steel mortar, and a 500 μm-pass alloy powder was obtained using a sieve with a mesh size of 500 μm.

[Activation Rate Test]

The activation rate of the obtained alloy powder was evaluated using a PCT measurement automatic high-pressure Sieverts’ apparatus (manufactured by Fuse Technonet Co., Ltd.). Prior to the evaluation, the following was performed: about 5 g of an alloy powder having particle sizes of 500 μm or less was loaded into a sample chamber equipped with an accumulator, a piping section, and a sample loading section and having a total volume of about 138 ml; evacuation was first performed at 80° C. for 2 hours (the degree of vacuum: about 0.5 to 2.5 Pa), then pressurization was performed at 25° C. and a hydrogen pressure of about 0.85 MPa (the total amount of hydrogen: about 0.05 mol), and the chamber was allowed to stand as it was for 15 hours. The hydrogen pressure in this period was measured, and the time it took for the hydrogen pressure to decrease by 60 kPa from the initial pressure was used as an index of ease of initial activation of the alloy. The index is referred to as the “degree of initial activation”. The results are shown in Table 1.

[Measurement of Hydrogen Pressure-Composition Isotherm Diagrams (PCT Curves)]

Figure 4:
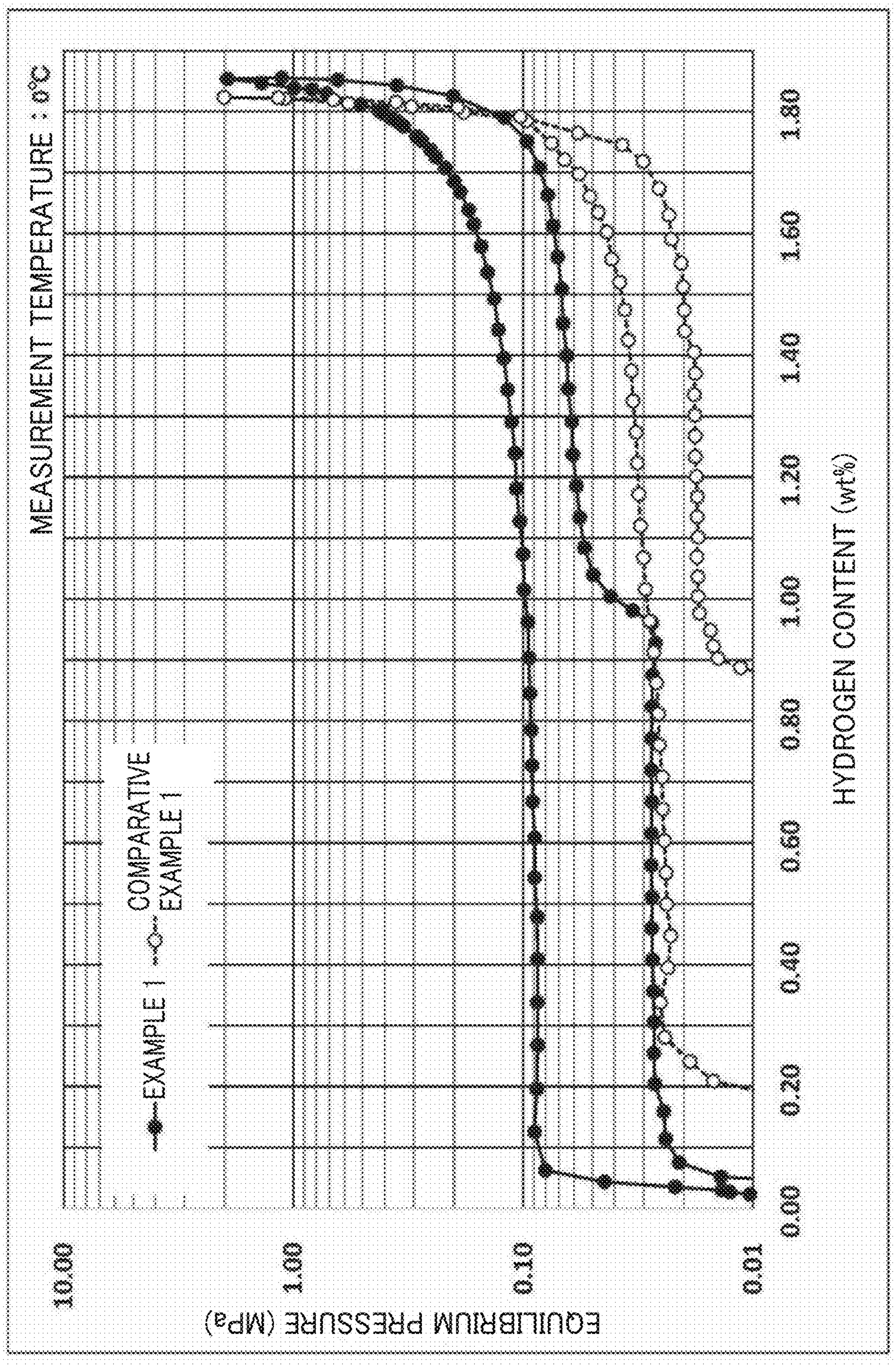
FIG. 4 is hydrogen pressure-composition isotherm diagrams (PCT curves) at 0° C. of an alloy powder of Example 1 and an alloy powder of Comparative Example 1.
Figure 5:
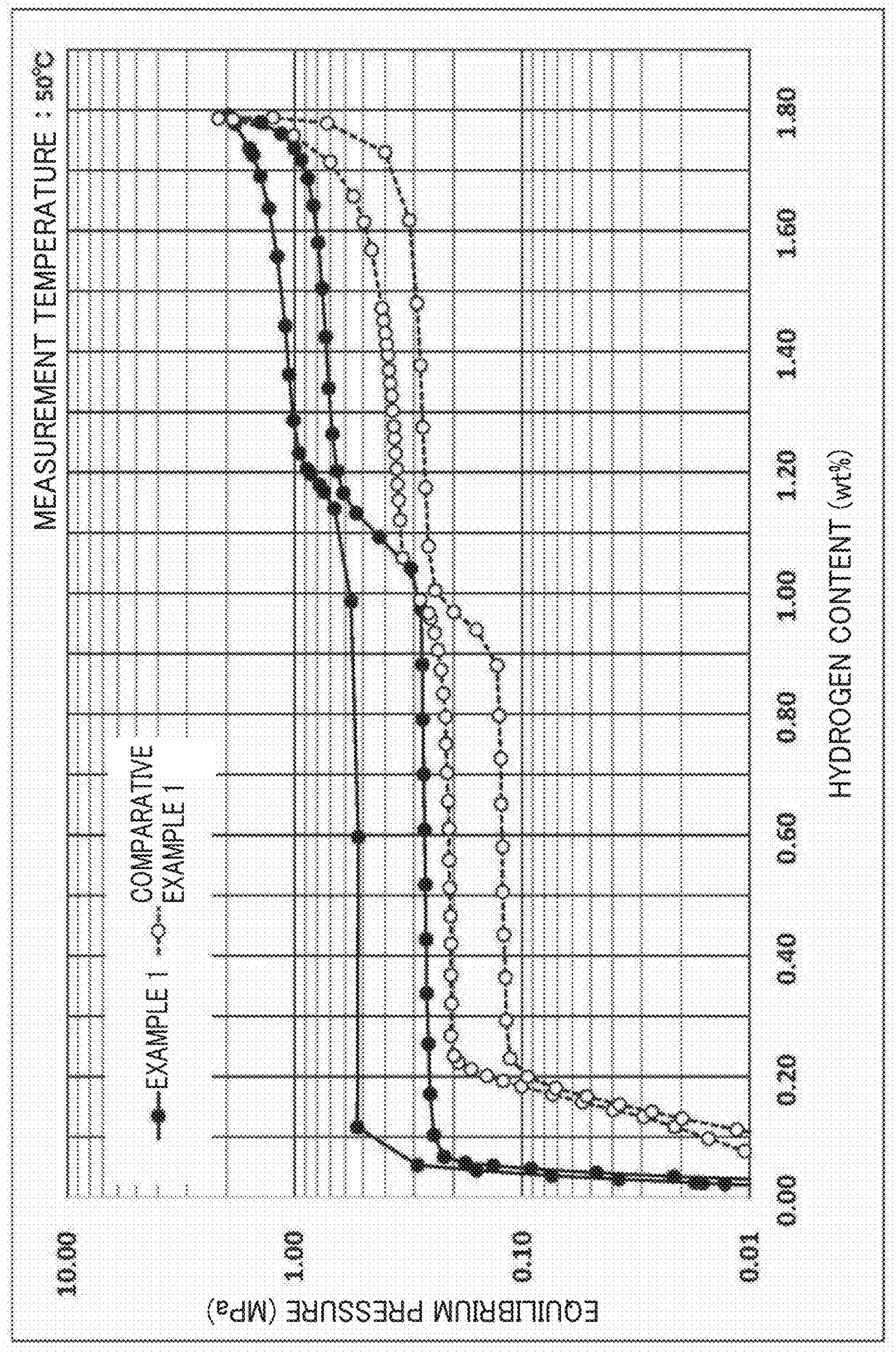
FIG. 5 is hydrogen pressure-composition isotherm diagrams (PCT curves) at 50° C. of an alloy powder of Example 1 and an alloy powder of Comparative Example 1.

The hydrogen storage/release characteristics of the obtained alloy powder were measured using a PCT measurement automatic high-pressure Sieverts’ apparatus (manufactured by Fuse Technonet Co., Ltd.), and PCT curves were obtained. The sample chamber loaded with the alloy powder used in the activation rate test was evacuated again at 80° C. for 1 hour (the degree of vacuum: about 0.5 to 2.5 Pa), and then pressurization was performed at a hydrogen pressure of about 2.5 MPa to absorb hydrogen until the hydrogen pressure was finally stabilized at 0° C. Subsequently, an operation in which evacuation is performed at 80° C. for 0.5 hours (the degree of vacuum: about 0.5 to 2.5 Pa) and similarly pressurization is performed at a hydrogen pressure of about 2.5 MPa to absorb hydrogen until the hydrogen pressure is finally stabilized at 0° C. was performed twice. Next, evacuation was performed at 80° C. for 2 hours (the degree of vacuum: about 0.5 to 2.5 Pa), and then the equilibrium pressures of absorption and desorption of hydrogen were measured under the condition of each of measurement temperatures of 0° C. and 50° C. while the hydrogen pressure was changed between 0.01 MPa and about 2 MPa. FIGS. 4 and 5 show hydrogen pressure-composition isotherm diagrams (PCT curves) at 0° C. and 50° C., respectively.

[Amount of Releasable Hydrogen]

From the obtained PCT curves, the hydrogen content at the time of 1 MPa of the PCT absorption curve at 0° C. and the hydrogen content at the time of 0.1 MPa of the PCT desorption curve at 50° C. were read, and the difference between them was determined. This numerical value is referred to as the "amount of releasable hydrogen". The results are shown in Table 1.

[Squareness]

From the obtained PCT curves, the hydrogen desorption pressure $P_{a1}$ at 0.3 wt (weight) % hydrogen content and the hydrogen desorption pressure $P_{a2}$ at 0.1 wt % hydrogen content of the PCT desorption curve at 50° C. were read, and the value of $[\{\log_{10}(P_{a1})-\log_{10}(P_{a2})\}/0.2]$(squareness) was obtained. The results are shown in Table 1.

Examples 2 to 28

An alloy cast piece and an alloy powder of each Example were produced in a similar manner to Example 1 except that the elemental composition of the alloy finally obtained and the heat treatment conditions were changed as shown in Tables 1 and 2, then surface analysis of an alloy cross section, and measurements of the number of pieces of the R-enriched phase, the R-enriched phase area ratio, the activation rate test, and the PCT curves were performed. Further, the degree of initial activation, the amount of releasable hydrogen, and the squareness were calculated from the activation rate test and the PCT curves. The pouring temperature, the cooling start temperature, and the cooling rate of the alloy melt of each of these Examples were 1450° C., 1400° C., and between 2000° C./sec and 3000° C./sec, which were approximately the same as those of Example 1. The results are shown in Tables 1 and 2.

Comparative Examples 1 to 5 and 7

Figure 2:
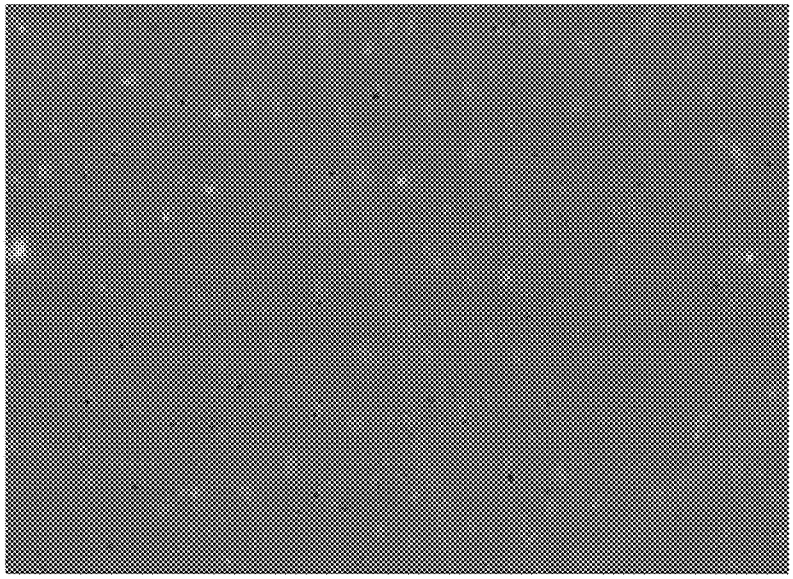
FIG. 2 is a view showing a COMP image photograph of a cross section of a post-heat-treatment alloy cast piece of Comparative Example 1.

An alloy cast piece and an alloy powder of each Comparative Example were produced in a similar manner to Example 1 except that the elemental composition of the alloy finally obtained and the heat treatment conditions were changed as shown in Table 2, and surface analysis of an alloy cross section, and measurements of the activation rate test and the PCT curves were performed. Further, the degree of initial activation, the amount of releasable hydrogen, and the squareness were calculated from the activation rate test and the PCT curves. The pouring temperature, the cooling start temperature, and the cooling rate of the alloy melt of each of these Comparative Examples were 1450° C., 1400° C., and between 2000° C./sec and 3000° C./sec, which were approximately the same as those of Example 1. The results are shown in Table 2. A copy of a COMP image of an alloy cross section of Comparative Example 1 is shown in FIG. 2.

Comparative Example 6

Figure 3:
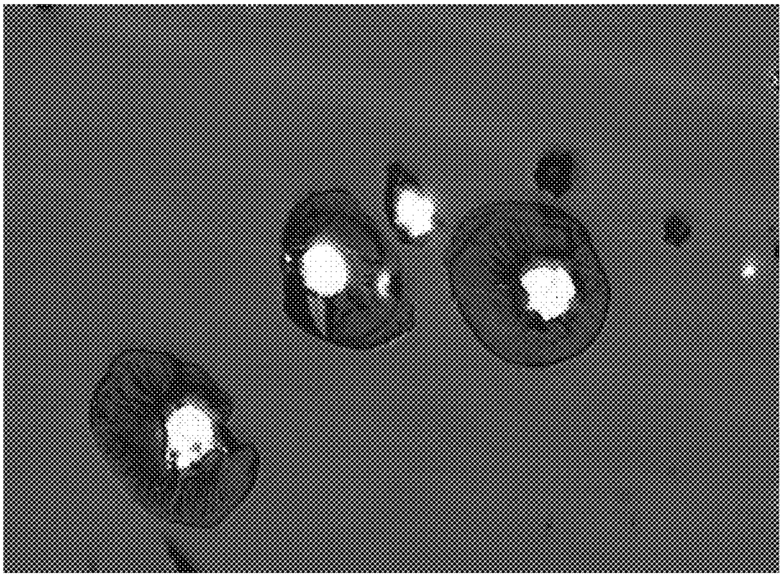
FIG. 3 is a view showing a COMP image photograph of a cross section of a post-heat-treatment alloy cast piece of Comparative Example 6.

Source material metals were weighed out such that the elemental composition of the alloy finally obtained would be the composition shown in Table 2, and were melted in an argon gas (Ar) atmosphere in a high-frequency melting furnace to obtain an alloy melt. Subsequently, with the pouring temperature of the melt set to 1450° C., the melt was poured into a copper mold and solidified, and an alloy ingot having a thickness of about 20 mm was obtained. The cooling start temperature of the alloy melt, that is, the temperature at the point of time when the alloy melt came into contact with the copper mold was about 1400° C. The cooling rate of the alloy melt was about 10° C./sec. The alloy cast piece obtained as above was subjected to heat treatment by being held at 1080° C. for 6 hours in an Ar atmosphere in a heat treatment furnace. Further, the alloy cast piece after heat treatment was pulverized with a stainless steel mortar, and a 500 μm-pass alloy powder was obtained using a sieve with a mesh size of 500 μm. For the alloy cast piece and the powder obtained, surface analysis of an alloy cross section, and measurements of the number of pieces of the R-enriched phase, the R-enriched phase area ratio, the activation rate test, and the PCT curves were performed in a similar manner to Example 1. Further, the degree of initial activation, the amount of releasable hydrogen, and the squareness were calculated from the activation rate test and the PCT curves. The results are shown in Table 2. A copy of a COMP image of an alloy cross section of Comparative Example 6 is shown in FIG. 3.

TABLE 1

| | Composition (molar ratio) | | | | | | | | | |
|---|---|---|---|---|---|---|---|---|---|---|
| | Ti<br>1ab | La | Ce<br>a | Pr | Nd | V | Zr<br>b | Mo | Fe<br>c | Mn<br>d |
| Example 1 | 0.971 | 0.005 | 0.024 | — | — | — | — | — | 0.828 | 0.104 |
| Example 2 | 0.971 | 0.005 | 0.024 | — | — | — | — | — | 0.828 | 0.104 |
| Example 3 | 0.971 | 0.005 | 0.024 | — | — | — | — | — | 0.828 | 0.104 |
| Example 4 | 0.977 | 0.003 | 0.020 | — | — | — | — | — | 0.846 | 0.068 |
| Example 5 | 0.971 | 0.005 | 0.024 | — | — | — | — | — | 0.908 | 0.024 |
| Example 6 | 0.971 | 0.005 | 0.024 | — | — | — | — | — | 0.928 | — |
| Example 7 | 0.977 | 0.003 | 0.020 | — | — | — | — | — | 0.888 | 0.051 |
| Example 8 | 0.982 | 0.001 | 0.017 | — | — | — | — | — | 0.832 | 0.047 |
| Example 9 | 0.976 | 0.003 | 0.014 | — | — | — | 0.007 | — | 0.793 | 0.112 |
| Example 10 | 0.958 | 0.003 | 0.019 | — | — | 0.020 | — | — | 0.837 | 0.037 |
| Example 11 | 0.971 | 0.005 | 0.024 | — | — | — | — | — | 0.828 | 0.094 |
| Example 12 | 0.971 | 0.005 | 0.024 | — | — | — | — | — | 0.828 | 0.094 |
| Example 13 | 0.971 | 0.005 | 0.024 | — | — | — | — | — | 0.828 | 0.104 |
| Example 14 | 0.976 | 0.003 | 0.021 | — | — | — | — | — | 0.822 | 0.034 |
| Example 15 | 0.977 | 0.003 | 0.020 | — | — | — | — | — | 0.894 | 0.045 |
| Example 16 | 0.977 | 0.003 | 0.020 | — | — | — | — | — | 0.894 | 0.035 |
| Example 17 | 0.977 | 0.003 | 0.020 | — | — | — | — | — | 0.894 | 0.035 |
| Example 18 | 0.977 | 0.003 | 0.020 | — | — | — | — | — | 0.894 | 0.035 |
| Example 19 | 0.977 | 0.003 | 0.020 | — | — | — | — | — | 0.894 | 0.035 |
| Example 20 | 0.978 | 0.003 | 0.012 | — | — | — | 0.007 | | 0.867 | 0.044 |
| Example 21 | 0.971 | 0.003 | 0.017 | 0.001 | 0.003 | — | — | 0.005 | 0.889 | 0.034 |
| Example 22 | 0.971 | 0.003 | 0.017 | 0.001 | 0.003 | — | — | 0.005 | 0.889 | 0.034 |

TABLE 1-continued

| | Composition (molar ratio) | | | | | | Degree of initial activation | Amount of releasable hydrogen | R-enriched phase | | |
|---|---|---|---|---|---|---|---|---|---|---|---|
| | Cr | Ni e | Al | Sn | C f | Heat treatment | (min) | (wt %) | Area ratio (%) | Number of pieces | Squareness |
| Example 1 | — | — | — | — | — | 1050° C. × 6 h | 180 | 1.79 | 2.57 | 690 | 0.14 |
| Example 2 | — | — | — | — | — | 550° C. × 6 h | 185 | 1.75 | 4.53 | 491 | 0.77 |
| Example 3 | — | — | — | — | — | No heat treatment | 403 | 1.73 | 3.58 | 437 | 0.81 |
| Example 4 | — | — | — | — | 0.006 | 1080° C. × 6 h | 416 | 1.78 | 2.50 | 206 | 0.18 |
| Example 5 | — | — | — | — | — | 1080° C. × 6 h | 469 | 1.73 | 2.43 | 323 | 0.25 |
| Example 6 | — | — | — | — | — | 1080° C. × 6 h | 864 | 1.68 | 2.38 | 303 | 0.33 |
| Example 7 | — | — | — | — | — | 1100° C. × 6 h | 679 | 1.78 | 2.48 | 343 | 0.21 |
| Example 8 | — | — | — | — | — | 1050° C. × 6 h | 140 | 1.74 | 2.21 | 190 | 0.11 |
| Example 9 | — | — | — | — | 0.002 | 1050° C. × 6 h | 50 | 1.79 | 1.64 | 90 | 0.08 |
| Example 10 | — | — | — | — | — | 1050° C. × 6 h | 186 | 1.81 | 2.79 | 230 | 0.24 |
| Example 11 | — | 0.010 | — | — | — | 1050° C. × 6 h | 112 | 1.70 | 2.16 | 515 | 0.02 |
| Example 12 | 0.010 | — | — | — | — | 1050° C. × 6 h | 137 | 1.78 | 2.41 | 675 | 0.35 |
| Example 13 | — | — | 0.012 | — | — | 1050° C. × 6 h | 202 | 1.76 | 2.82 | 510 | 0.28 |
| Example 14 | — | 0.014 | — | — | — | 1050° C. × 6 h | 78 | 1.72 | 1.80 | 314 | 0.08 |
| Example 15 | — | — | — | — | — | 1100° C. × 6 h | 296 | 1.78 | 1.70 | 445 | 0.20 |
| Example 16 | 0.010 | — | — | — | — | 1100° C. × 6 h | 193 | 1.75 | 1.37 | 745 | 0.22 |
| Example 17 | 0.010 | — | — | — | — | No heat treatment | 486 | 1.72 | 0.85 | 979 | 0.60 |
| Example 18 | 0.010 | — | — | — | — | 950° C. × 6 h | 341 | 1.77 | 0.90 | 715 | 0.23 |
| Example 19 | 0.010 | — | — | — | — | 980° C. × 2 h | 241 | 1.71 | 0.88 | 885 | 0.32 |
| Example 20 | — | — | 0.005 | — | 0.011 | 1050° C. × 6 h | 140 | 1.79 | 1.47 | 275 | 0.09 |
| Example 21 | — | — | — | 0.005 | 0.002 | 1050° C. × 6 h | 239 | 1.76 | 2.02 | 287 | 0.20 |
| Example 22 | — | — | — | 0.005 | 0.002 | 950° C. × 6 h | 502 | 1.73 | 1.25 | 1346 | 0.20 |

TABLE 2

| | Composition (molar ratio) | | | | | | | | | | |
|---|---|---|---|---|---|---|---|---|---|---|---|
| | Ti 1-a-b | La a | Ce | V | Zr | Nb b | Fe c | Mn d | Co | Ni e | Cu |
| Example 23 | 0.977 | 0.003 | 0.020 | — | — | — | 0.894 | 0.035 | 0.005 | — | 0.005 |
| Example 24 | 0.977 | 0.003 | 0.020 | — | — | — | 0.894 | 0.035 | 0.005 | — | 0.005 |
| Example 25 | 0.981 | 0.001 | 0.009 | — | 0.009 | — | 0.903 | 0.041 | — | 0.005 | — |
| Example 26 | 0.947 | — | 0.038 | 0.005 | 0.005 | 0.005 | 0.834 | 0.033 | — | — | — |
| Example 27 | 0.947 | — | 0.038 | 0.005 | 0.005 | 0.005 | 0.834 | 0.033 | — | — | — |
| Example 28 | 0.977 | 0.003 | 0.020 | — | — | — | 0.894 | 0.035 | — | — | — |
| Comparative Example 1 | 0.995 | 0.005 | — | — | — | — | 0.647 | 0.351 | — | — | — |
| Comparative Example 2 | 0.994 | 0.006 | — | — | — | — | 0.770 | 0.251 | — | — | — |
| Comparative Example 3 | 0.993 | 0.007 | — | — | — | — | 0.905 | 0.061 | — | — | — |
| Comparative Example 4 | 0.993 | 0.007 | — | — | — | — | 0.936 | 0.029 | — | — | — |
| Comparative Example 5 | 0.992 | 0.008 | — | — | — | — | 0.853 | 0.104 | — | — | — |
| Comparative Example 6 | 0.977 | 0.003 | 0.020 | — | — | — | 0.888 | 0.051 | — | — | — |
| Comparative Example 7 | 1.000 | — | — | — | — | — | 0.918 | 0.054 | — | — | — |

| | Composition (molar ratio) | | | | | Degree of initial activation | Amount of releasable hydrogen | R-enriched phase | | |
|---|---|---|---|---|---|---|---|---|---|---|
| | B | Al e | Ga | Si | Heat treatment | (min) | (wt %) | Area ratio (%) | Number of pieces | Squareness |
| Example 23 | — | — | — | — | 1050° C. × 6 h | 165 | 1.76 | 1.30 | 270 | 0.20 |
| Example 24 | — | — | — | — | 1050° C. × 0.5 h | 172 | 1.74 | 1.31 | 365 | 0.26 |
| Example 25 | — | 0.005 | — | — | 1050° C. × 6 h | 74 | 1.80 | 0.81 | 37 | 0.26 |
| Example 26 | 0.005 | — | — | 0.004 | 1050° C. × 6 h | 27 | 1.71 | 1.68 | 290 | 0.09 |
| Example 27 | 0.005 | — | — | 0.004 | 1000° C. × 1 h | 40 | 1.71 | 3.02 | 389 | 0.09 |
| Example 28 | — | 0.007 | 0.005 | — | 1050° C. × 6 h | 439 | 1.68 | 1.27 | 1096 | 0.19 |

TABLE 2-continued

| | | | | | | | | | | |
|---|---|---|---|---|---|---|---|---|---|---|
| Comparative Example 1 | — | — | — | — | 1080° C. × 6 h | 329 | 1.60 | 0.08 | 29 | 5.84 |
| Comparative Example 2 | — | — | — | — | 1080° C. × 6 h | 214 | 1.53 | 0.01 | 5 | 4.09 |
| Comparative Example 3 | — | — | — | — | 1080° C. × 6 h | More than 900 | *1 | 0.09 | 17 | *2 |
| Comparative Example 4 | — | — | — | — | 1080° C. × 6 h | More than 900 | *1 | 0.07 | 15 | *2 |
| Comparative Example 5 | — | — | — | — | 1080° C. × 6 h | More than 900 | 0.73 | 0.18 | 304 | 0.19 |
| Comparative Example 6 | — | — | — | — | 1080° C. × 6 h | 475 | 1.54 | 1.95 | 7 | 1.13 |
| Comparative Example 7 | — | 0.012 | — | — | 1050° C. × 6 h | More than 900 | *1 | 0.00 | 0 | *2 |

*1 Hydrogen was not absorbed
*2 Calculation was impossible

As is clear from the tables, the alloy of each Example has an excellent amount of releasable hydrogen as compared to the alloy of each Comparative Example. Further, the alloy of each Example has also a favorable degree of initial activation.

The invention claimed is:

1. A hydrogen storage material comprising an alloy of an elemental composition represented by Formula (1) below, wherein, in a 1000 times magnified COMP image of a cross section of the alloy obtained by an electron probe microanalyzer (EPMA), 25 or more and 3000 or less pieces of a phase in which R is enriched and that have phase sizes of 0.1 μm or more and 10 μm or less are present in a field of view of 85 μm×120 μm of the COMP image, and an R-enriched phase area ratio $[(S_R/S)\times 100(\%)]$ of a total area $S_R$ μm$^2$ of the pieces of the phase present in the field of view to an area S (10200) μm$^2$ of the field of view is 0.3% or more and 6.0% or less,

[Chem. 1]

$$\mathrm{Ti}_{(1-a-b)}R_aM1_b\mathrm{Fe}_c\mathrm{Mn}_dM2_e\mathrm{C}_f \quad (1)$$

wherein R is at least one selected from rare earth elements, and indispensably contains Ce;

M1 represents at least one selected from the group consisting of V, Zr, Nb, Ta, and Mo;

M2 represents at least one selected from (i) transition metal elements other than rare earth elements, M1, Ti, Fe, and Mn, and, (ii) Al, B, Ga, Si, and Sn, wherein the rare earth elements include Sc and Y; and $$a \text{ is } 0.003 \le a \le 0.15,\ b \text{ is } 0 \le b \le 0.20,$$

$$c \text{ is } 0.40 \le c \le 1.15,\ d \text{ is } 0 \le d \le 0.15,\ e \text{ is } 0 \le e \le 0.20,$$

$$f \text{ is } 0 \le f \le 0.07, \text{ and } c+d+e \text{ is } 0.60 \le c+d+e \le 1.15.$$

2. The hydrogen storage material according to claim 1, wherein, in a hydrogen pressure-composition isotherm diagram at 50° C. of the alloy, a hydrogen desorption pressure $P_{a1}$ at 0.3 wt % hydrogen content and a hydrogen desorption pressure $P_{a2}$ at 0.1 wt % hydrogen content satisfy a relational expression of $[\{\log_{10}(P_{a1})-\log_{10}(P_{a2})\}/0.2]\le 1.10$.

3. A hydrogen storage container comprising the hydrogen storage material according to claim 2.

4. A hydrogen supply apparatus comprising the hydrogen storage container according to claim 3.

5. The hydrogen storage material according to claim 1, formed of a composite in which the alloy and a resin are mixed.

6. A hydrogen storage container comprising the hydrogen storage material according to claim 5.

7. A hydrogen supply apparatus comprising the hydrogen storage container according to claim 6.

8. A hydrogen storage container comprising the hydrogen storage material according to claim 1.

9. A hydrogen supply apparatus comprising the hydrogen storage container according to claim 8.

* * * * *